United States Patent
Soto (10) Patent No.: US 10,874,088 B1
(45) Date of Patent: Dec. 29, 2020

(54) PET TOY APPARATUS

(71) Applicant: The Hartz Mountain Corporation, Secaucus, NJ (US)

(72) Inventor: Johann Soto, Rutherford, NJ (US)

(73) Assignee: THE HARTZ MOUNTAIN CORPORATION, Secaucus, NJ (US)

( * ) Notice: Subject to any disclaimer, the term of this patent is extended or adjusted under 35 U.S.C. 154(b) by 0 days.

(21) Appl. No.: 16/896,805

(22) Filed: Jun. 9, 2020

Related U.S. Application Data (60) Provisional application No. 62/935,927, filed on Nov. 15, 2019.

(51) Int. Cl.
*A01K 15/00* (2006.01)
*A01K 15/02* (2006.01)

(52) U.S. Cl.
CPC .................. *A01K 15/025* (2013.01)

(58) Field of Classification Search
CPC ...... A01K 15/025; A63F 9/0601; F16B 47/00
USPC ........ 119/702, 707, 708; 446/92; 248/205.5, 248/309.3, 362, 363, 537
See application file for complete search history.

(56) References Cited

U.S. PATENT DOCUMENTS

| | | | | |
|---|---|---|---|---|
| 1,523,042 A * | 1/1925 | Thomas | .................. | E04H 12/32 248/537 |
| 2,009,360 A * | 7/1935 | Koch | .................... | B43M 99/003 211/69.5 |
| 2,320,608 A * | 6/1943 | Jones | ........................ | A47K 5/05 248/205.5 |
| 2,432,719 A * | 12/1947 | Braun | ..................... | F16B 47/00 248/544 |
| 3,727,583 A * | 4/1973 | Muraro | ................. | A01K 15/025 119/711 |
| 4,073,462 A * | 2/1978 | Whitaker | ................ | A01K 97/10 248/206.4 |
| 4,455,006 A * | 6/1984 | Aaserude | ................. | B60Q 7/00 248/205.6 |
| 4,517,922 A * | 5/1985 | Lind | .................... | A01K 15/025 119/708 |
| 4,691,851 A * | 9/1987 | Aaserude | ................ | B60R 11/00 224/482 |
| 4,712,510 A * | 12/1987 | Tae-Ho | ................. | A01K 15/025 119/708 |
| 4,955,493 A * | 9/1990 | Touzani | ............... | B65D 1/0292 215/372 |
| 5,148,769 A * | 9/1992 | Zelinger | .............. | A01K 15/025 119/708 |
| 5,385,161 A * | 1/1995 | Loker | .................... | A45B 11/00 135/15.1 |
| 6,318,300 B1 * | 11/2001 | Renforth | .............. | A01K 15/025 119/702 |

(Continued)

*Primary Examiner* — Peter M Poon
*Assistant Examiner* — Danielle A Clerkley
(74) *Attorney, Agent, or Firm* — Gottlieb, Rackman & Reisman, P.C.

(57) ABSTRACT

A pet toy apparatus that includes a suction cup, a support apparatus and a toy apparatus that are configured to be selectively coupled to one another to form a structure which can be hung from a supporting surface such as a window pane, a wall, etc. to attract a pet into play. The suction cup is configured to maintain the support apparatus at an angle with respect to a horizontal plane in order to increase the strength of the selective connection between the suction cup and the support apparatus.

22 Claims, 10 Drawing Sheets

(56) References Cited

U.S. PATENT DOCUMENTS

| | | | |
|---|---|---|---|
| 6,360,694 B1 * | 3/2002 | Noto | A01K 15/025 |
| | | | 119/707 |
| 9,635,983 B2 * | 5/2017 | Berge | A47J 47/16 |
| D821,651 S | 6/2018 | Coresh | |
| 10,203,001 B2 | 2/2019 | White | |
| 10,420,324 B2 * | 9/2019 | Wilhelm | A63H 33/26 |
| 2003/0109815 A1 | 6/2003 | Horst | |
| 2006/0054105 A1 * | 3/2006 | Renforth | A01K 15/025 |
| | | | 119/708 |
| 2007/0138358 A1 * | 6/2007 | Chang | F16C 11/106 |
| | | | 248/205.5 |
| 2008/0111037 A1 | 5/2008 | Carnevali | |
| 2009/0194651 A1 | 8/2009 | Takahashi et al. | |
| 2010/0181458 A1 | 7/2010 | Liu | |
| 2011/0226922 A1 | 9/2011 | Ishizaki et al. | |
| 2011/0277697 A1 * | 11/2011 | Lipscomb | A01K 15/025 |
| | | | 119/708 |
| 2012/0175484 A1 | 7/2012 | Hao et al. | |
| 2012/0193500 A1 | 8/2012 | Kniss et al. | |
| 2012/0234258 A1 * | 9/2012 | Cook | A01K 15/025 |
| | | | 119/708 |
| 2014/0158842 A1 | 6/2014 | Yang | |
| 2014/0197288 A1 | 7/2014 | Yang | |

\* cited by examiner

PET TOY APPARATUS

CROSS-REFERENCE TO RELATED APPLICATION

This patent application claims priority under 35 U.S.C. § 119 to U.S. Provisional Patent Application No. 62/935,927, filed on Nov. 15, 2019, the disclosure of which is incorporated by reference herein in its entirety.

FIELD OF THE INVENTION

The present invention relates generally to a pet toy, and more particularly to a suction cup and a support apparatus that together are configured to hang at least one pet toy therefrom.

BACKGROUND OF THE INVENTION

Suction cups and support apparatuses that are affixable to suction cups to selectively couple suction cups to objects are generally known.

Suction cups are typically used to assist in affixing an object(s) to a desired surface. The object can either be directly or indirectly permanently affixed to a suction cup or the object can be directly or indirectly selectively coupleable to a suction cup. Suction cups can include a mechanism(s) to aid in affixing a cup portion thereof to a surface and detaching the cup portion from the surface. However, such mechanisms can increase the size, weight, and manufacturing cost of the suction cup.

Support apparatuses are commonly inconvenient to affix with or separate from a suction cup and/or may not be strong enough to support an object therefrom. For example, a support apparatus can include a threaded rod that is attachable to a suction cup and an object to be supported by the suction cup can include a cavity that is configured to selectively receive the threaded rod therein. The exemplary combination of the support apparatus and object requires rotation of the support apparatus and/or the object with respect to one another a plurality of times to couple the object to the supportive apparatus and in turn the suction cup or uncouple the parts from each other.

Manual coupling can be challenging because of the need to orientate the threaded portion of the support apparatus within the cavity of the object and simultaneously secure the two parts to each other. Additionally, manual coupling can cause the individual coupling the parts to each other to tire and in turn discourage the individual from wanting to couple/uncouple the support apparatus to/from the object in the future. This in turn, defeats the purpose of the suction cup being selectively coupleable to an object by the support apparatus.

Additionally, if an object weighs more than the maximum load which a support apparatus can withstand, the assembly will fail.

SUMMARY OF THE INVENTION

The present invention relates to a pet toy apparatus that includes a suction cup and a support apparatus (e.g., wand) that are selectively connectable to one another to form a structure that can be used to hang a pet toy therefrom. The suction cup can be releasably affixed to a supporting surface such as a window, wall, etc. In an embodiment, the pet toy can be hung from a string at a free end (e.g., cantilevered end) of the support apparatus. Because the cantilevered end of the support apparatus is spaced from the suction cup, the pet toy can move, for example, in a pendulum-like motion from the cantilevered end of the support apparatus when the suction cup is affixed to a supporting surface at a certain elevation above ground level with the motion of the pet toy attracting a pet into play.

The suction cup can be configured to align the support apparatus at an acute angle with respect to an imaginary line that extends perpendicular to the center of the suction cup. The angled alignment of the support apparatus in combination with the suction cup enables the connection between the support apparatus and suction cup to withstand not only the weight of the support apparatus and toy, but also the forces exerted on the toy by the pet, for example, when the pet strikes the toy or hangs from the toy during play.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF EMBODIMENTS OF THE PRESENT INVENTION

Exemplary embodiments of the present invention will be described more fully hereinafter with reference to the accompanying drawings. The present invention may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

An embodiment, the present invention, which will be described in detail below, is directed generally to a pet toy apparatus that includes a suction cup 100, a support apparatus 200 and a toy apparatus 300.

As shown in FIGS. 1A-1F, the suction cup 100 generally includes a body 101 that has a cup portion 102 and a housing 104 that extends from the cup portion 102.

Figure 1A:
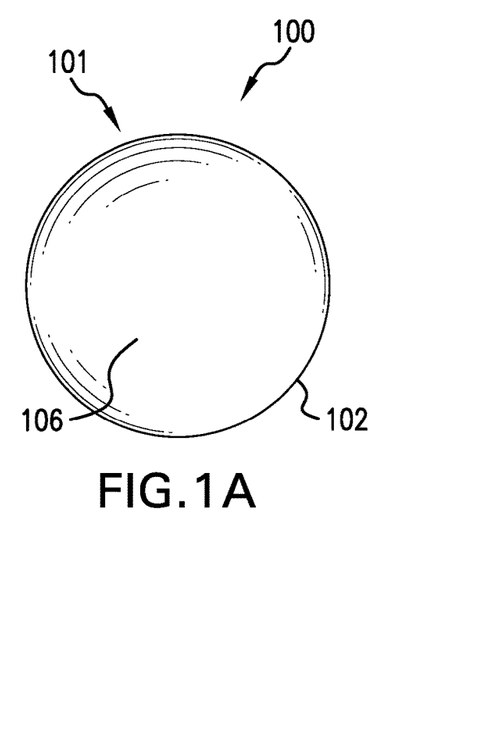
FIG. 1A is a front view illustrating a suction cup according to an exemplary embodiment of the present invention.
Figure 1B:
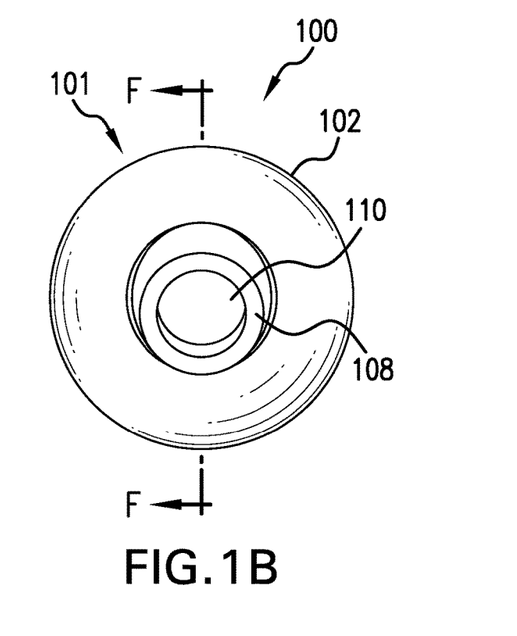
FIG. 1B is a rear view illustrating the suction cup of FIG. 1.
Figure 1C:
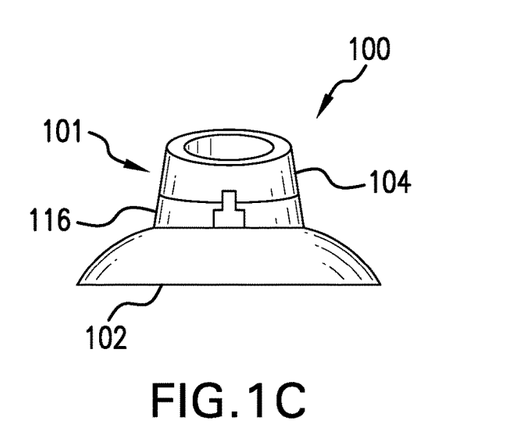
FIG. 1C is a bottom view illustrating the suction cup of FIG. 1.
Figure 1D:
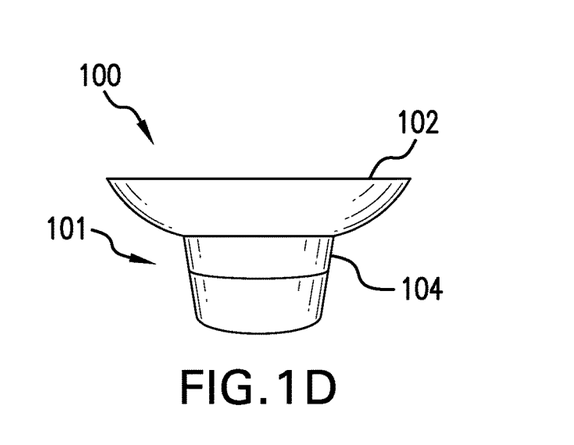
FIG. 1D is a top view illustrating the suction cup of FIG. 1.
Figure 1E:
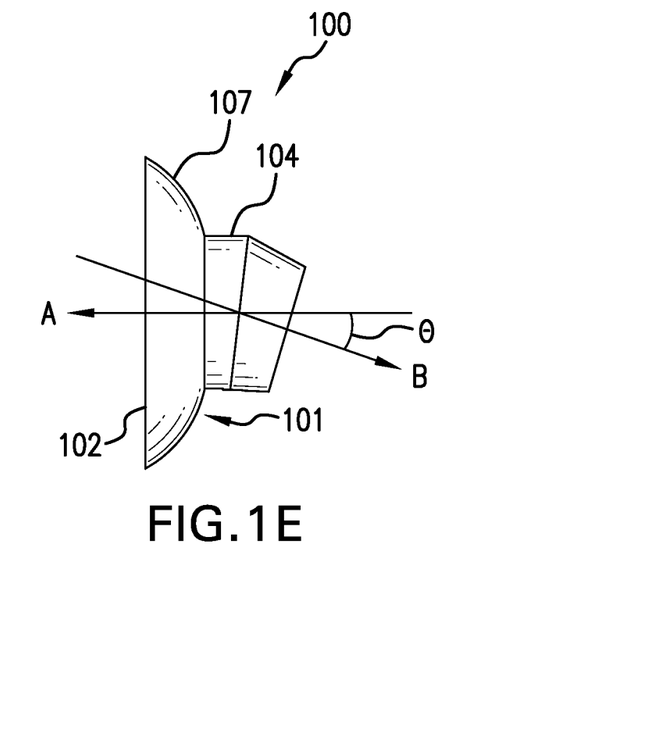
FIG. 1E is a side elevational view illustrating the suction cup of FIG. 1.
Figure 1F:
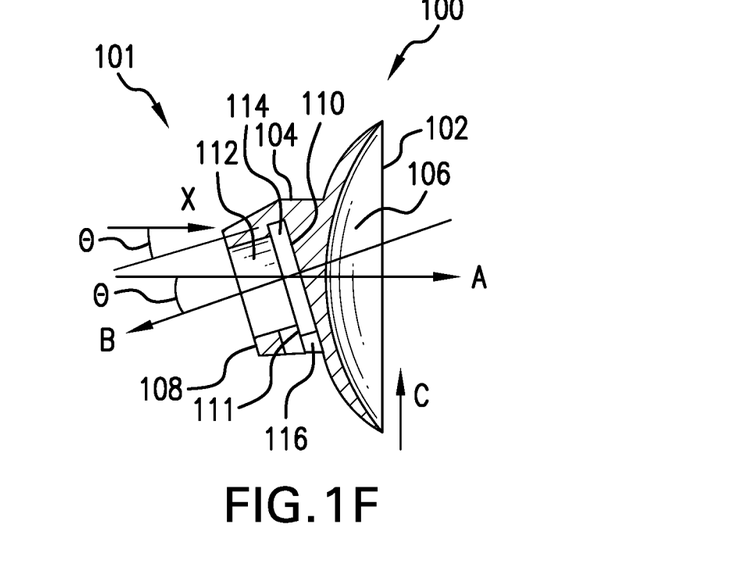
FIG. 1F is a cross-sectional view of the suction cup of FIG. 1 taken along line F-F of FIG. 1B.

The cup portion 102 includes a first surface 106 and a second surface 107 that is spaced from the first surface 106. When the first surface 106, which is concave as viewed in cross-section or looking at the first surface 106, is pressed against a supporting surface such as glass, tile, metal, etc., air is drawn out of a region between the first surface 106 and the supporting surface, creating a vacuum between the first surface 106 and the supporting surface with atmospheric pressure pushing against the second surface 107, forcing the cup portion 102 to maintain a seal between the suction cup 100 and the supporting surface.

As shown in FIG. 1F, the housing 104 includes a main or first opening 112 that extends inwardly toward the cup portion 102 from a first end 108 of the housing 104 and a channel 114 that extends contiguously to and inwardly from the opening 112 toward the cup portion 102. The channel 114 is delimited by a first internal surface 110 and a second internal surface 111 (see FIGS. 1B and 1F) of the housing 104. The channel 114 can further extend outwardly in at least one direction to an exterior sidewall of the supporting member 104, forming a second opening 116 between the channel 114 and the exterior surface of the housing 104. The suction cup 100 may be made of an elastomeric material such as unsaturated rubber, saturated rubber, other elastomers (e.g., latex), and/or a mixture thereof. More specifically, the cup portion 102 and the housing 104 may be made, at least in part, of neoprene, silicone, polyvinyl chloride (PVC), natural polyisoprene (e.g., polyisoprene natural rubber and polyisoprene gutta-percha), synthetic polyisoprene (e.g., isoprene rubber), polybutadiene (e.g., butadiene rubber), chloroprene rubber (e.g., polychloroprene, neoprene, baypren etc.), butyl rubber (e.g., copolymer of isobutylene and isoprene), halogenated butyl rubbers (e.g., chloro butyl rubber, bromo butyl rubber), styrene-butadiene rubber (e.g., copolymer of styrene and butadiene), acrylonitrile-butadiene-styrene copolymer (ABS), nitrile rubber (e.g., copolymer of butadiene and acrylonitrile), hydrogenated nitrile rubbers, ethylene propylene rubber, ethylene propylene diene rubber, epichlorohydrin rubber, polyacrylic rubber, silicone, fluorosilicone rubber, fluoroelastomers, perfluoroelastomers, polyether block amides, polyethylene, polypropylene and/or ethylene-vinyl acetate. It is understood that these are non-limiting examples of polymer materials that can be used to form the suction cup 100 with preferred material being PVC.

FIGS. 2A-2F illustrate the support apparatus 200. The support apparatus 200 can be of any desired length and generally includes a body 202 that is delimited between a first end 204 and a second end 206.

It is noted that the support apparatus 200 may be made of a polymer material such as polycarbonate, polypropylene (PP), polyethylene terephthalate (PET and/or PETE), high-density polyethylene (HDPE), low-density polyethylene (LDPE), PVC, Polystyrene (PS), etc. with polypropylene being the preferred material for forming the support apparatus 200 is polypropylene. The support apparatus 200 may alternatively be made of an elastomeric material that has a greater elastic modulus than the housing 104 to ensure a sturdy connection and orientation with respect to the suction cup 100.

As depicted in FIGS. 2A and 2C-2E, the first end 204 of the support apparatus 200 can include an end cap 208 and a projection 210 that has a first leg 212 that extends at the first end 204 thereof from the body 202 and the end portion 208 and a second leg 214 that extends at an angle from a second end of the first leg 212. As shown, for example, in FIG. 2C, the projection 210 has a hook-like or L-shape. At the second end 206, the support apparatus 200 can include a tubular portion 218 that has a cavity 220 that can be internally threaded (see FIG. 2C).

Figures 2A, 2B:
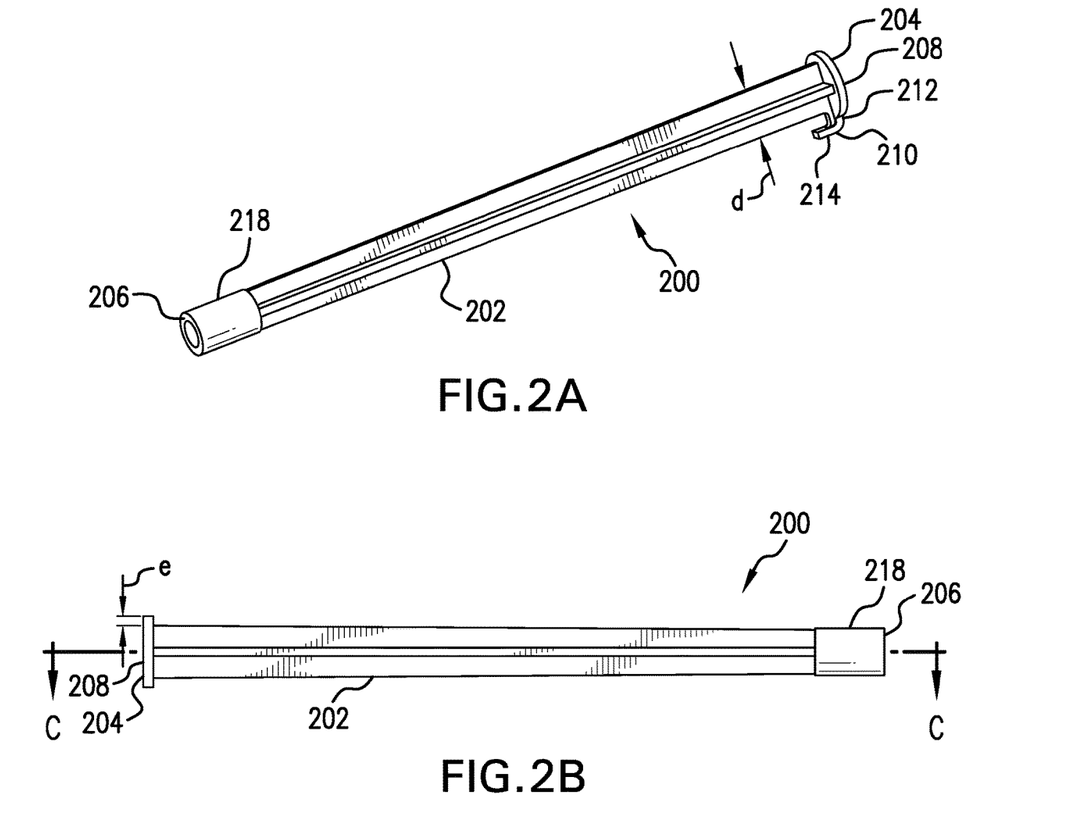
FIG. 2A is a perspective view illustrating a support apparatus according to an exemplary embodiment of the present invention.
FIG. 2B is a first side view illustrating the support apparatus of FIG. 2A.

As shown in FIGS. 2A-2B, the first leg 212 and the second leg 214 may extend at a right angle with respect to one another. However, the present invention is not limited thereto, and the first leg 212 and the second leg 214 may also extend at angle that is smaller than 90 degrees, but greater than 0 degrees (e.g., an acute angle) or at an angle that is greater than 90 degrees, but smaller than 180 degrees (e.g., an obtuse angle).

Figure 2C:
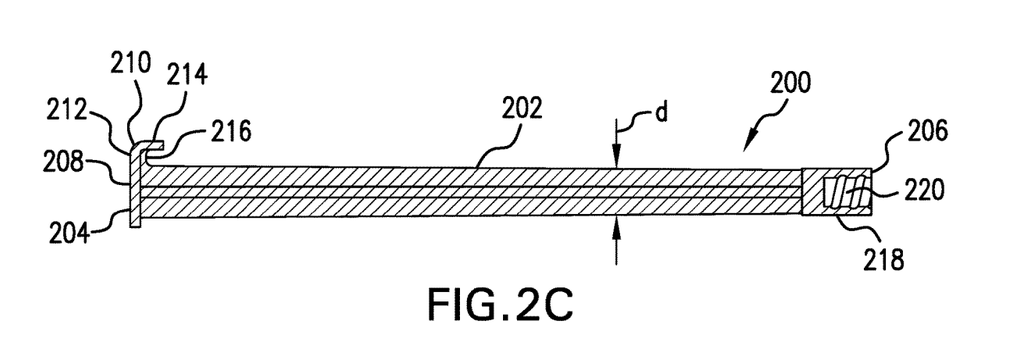
FIG. 2C is a cross-sectional view of the support apparatus of FIG. 2A taken along line C-C of FIG. 2B.
Figure 2D:
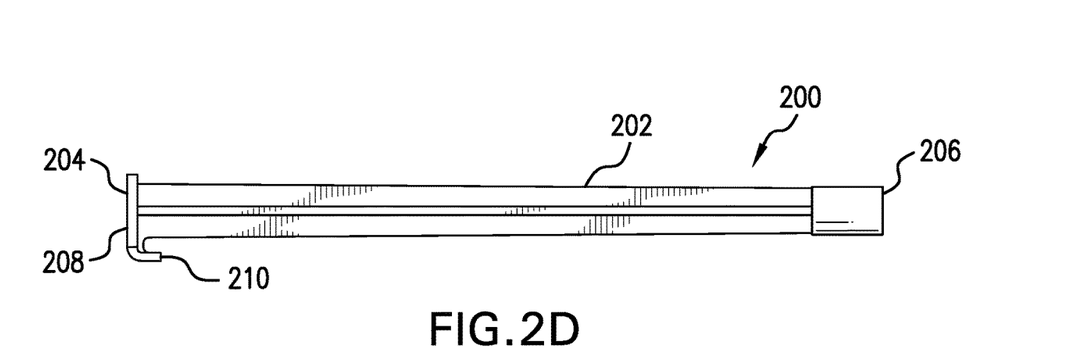
FIG. 2D is a second side view of the support apparatus of FIG. 2A.
Figure 2E:
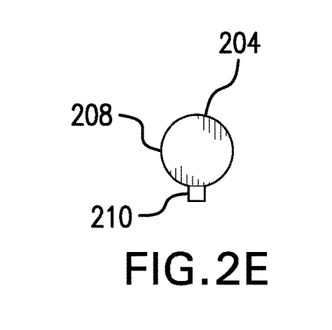
FIG. 2E is a first end view of the support apparatus of FIG. 2A.
Figure 2F:
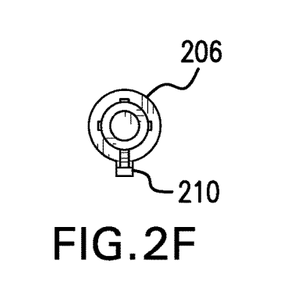
FIG. 2F is a second end view of the support apparatus of FIG. 2A.

As shown in FIGS. 2A and 2C-2D, an exterior surface of the hook-like projection 210 at a junction between the first leg 212 and the second leg 214 may be filleted (e.g., rounded). Alternatively, the exterior surface at the junction between the first leg 212 and the second leg 214 may be chamfered or may be an edge that is neither chamfered nor filleted. In addition, as shown in FIG. 2C, an inner side 216 of the projection 210 may be curved (e.g., rounded).

The end cap 208 and the projection 210 are configured to selectively couple the support apparatus 200 to the supporting member 104 of the suction cup 100.

As shown in FIG. 2B, the end cap 208 can have a larger diameter than a width d of the body 202 and protrude laterally from the body 202 by a distance e.

Although the end cap 208 is shown as being round, the end cap 208 can be any other shape that is known or may become known. For example, the end cap 208 can be polygonal, ovoid, elliptical, or a shape that includes at least one curved portion and at least one straight portion. Regardless of the shape of the end cap 208, an outer periphery of the end cap 208 extends laterally beyond the width d of the body 202. In addition, as shown in FIGS. 2B-2E, the end cap 208 can have a flat exterior surface, an exterior surface that is partially flat, or an exterior surface which includes concave and/or convex portions.

As shown in FIGS. 2A and 2C-2E, the projection 210 may be connected to the end cap 208 and may extend laterally beyond the width d of the body 202.

In order for the housing 104 to be selectively coupled with the support apparatus 200, the first end 204 of the support apparatus 200 is inserted into the housing 104 through the main opening 112 thereof.

To selectively couple the housing 104 and the support apparatus 200 to one another, the end cap 208, the projection 210 and a portion of the first end 204 of the support apparatus 200 are first inserted in the opening 112 of the housing 104 and then the end cap 208 and the projection 210 are inserted into the channel 114 with the projection 210 orientated to extend through the second opening 116 to an exterior surface of the housing 104. Due to its elasticity, the supporting member 104 may be temporarily deformed (e.g., enlarged, or stretched) to allow the first end 204 of the support apparatus 200 to be inserted within the supporting member 104 and, if desired, to allow the support apparatus 200 to be removed from the supporting member 104.

Figure 4A:
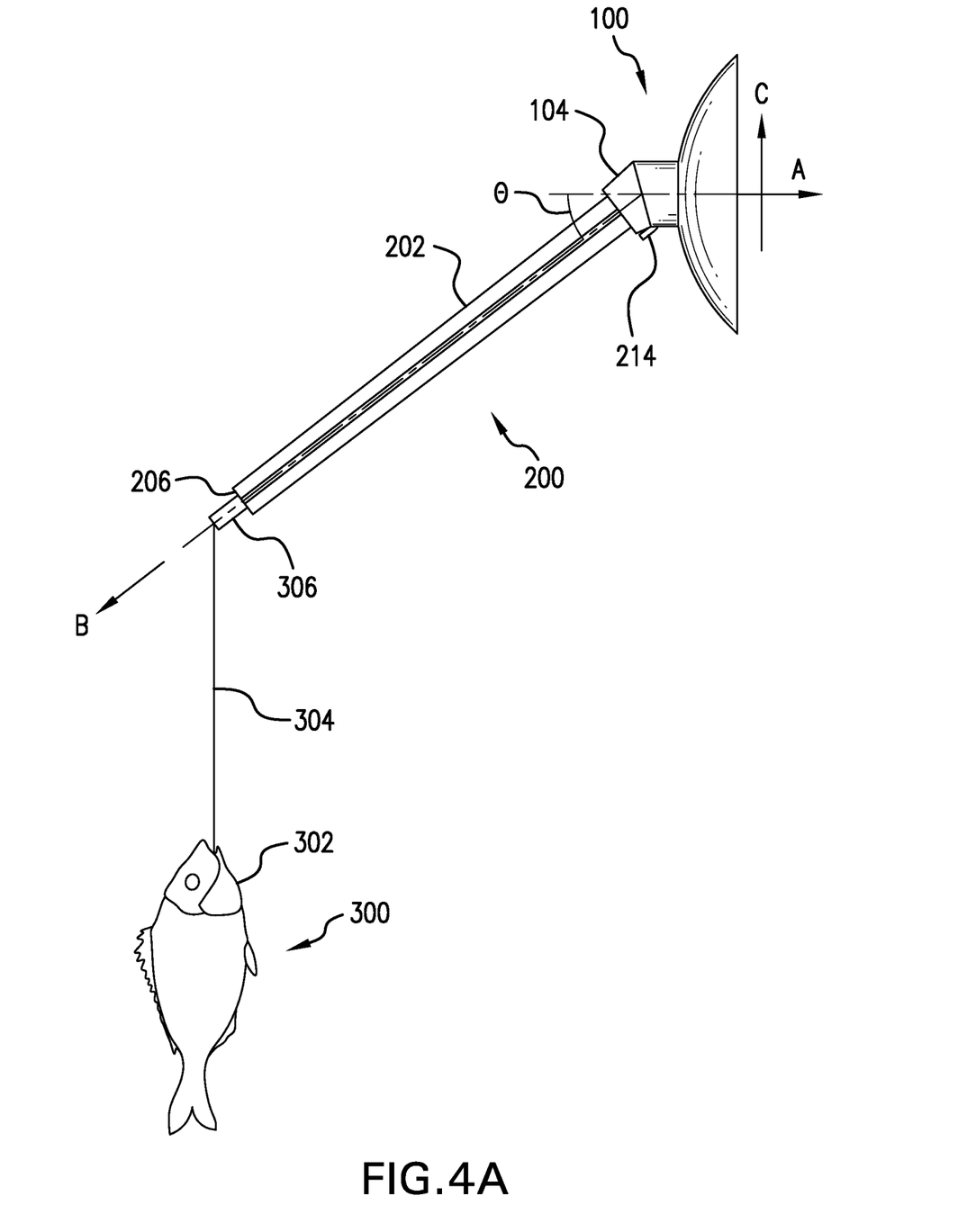
FIG. 4A is a side view illustrating the suction cup of FIGS. 1A-1F, the support apparatus of FIGS. 2A-2F and the pet toy of FIG. 3 in an assembled state with the support apparatus being aligned downwardly, according to an exemplary embodiment of the present invention.

The support apparatus 200 can be uncoupled from the suction cup 100 by, for example, pressing down on the support apparatus 200 with a certain amount of force (e.g., by hand) when the suction cup 100 and the support apparatus 200 are in the downwardly orientation, as shown in FIGS. 1F and 4A, thereby using the projection 210 as a hinge for extracting the end cap 208 from the channel 114 and ultimately the opening 212 of the housing 204.

In an embodiment, the diameter of the first surface 106 of the cup portion 102 is 1.6 inches, the diameter of the channel 114 is about 0.59 inches, and the diameter of the opening 112 is the same diameter/width as the body 202 of the support apparatus 200 or smaller than the diameter/width of the body 202. Additionally, the second opening 116 can be the same size (or diameter) as the projection 210. Alternatively, the second opening 116 may have a slightly larger diameter than the width of the projection 210.

In an embodiment, the overall length of the support apparatus 200 is about 6.20 inches and more specifically 6.22 inches. The diameter of the end cap 208 is about 0.60 and more specifically 0.59 inches with the first part 212 of the projection 210 extending laterally from the end cap 208 about 0.10 inches and more specifically 0.12 inches, the second part 214 of the projection 210 extending laterally from the end cap 208 toward the second end 206 about 0.30 inches and more specifically 0.28 inches, and the width d of the body 202 being about 0.40 inches and more specifically 0.39 inches.

It is understood that the dimensions provided above for the suction cup 100 and the support apparatus 200 are merely exemplary. These dimensions can be modified as needed by considering the desired overall length of the support apparatus 200, the maximum bending moment and the maximum shear force that the selective connection between the support apparatus 200 and the suction cup 100 can resist without causing the suction cup 100 and the support apparatus 200 to become disconnected from one another, and the suction force that the suction cup 100 can generate.

Figure 3:
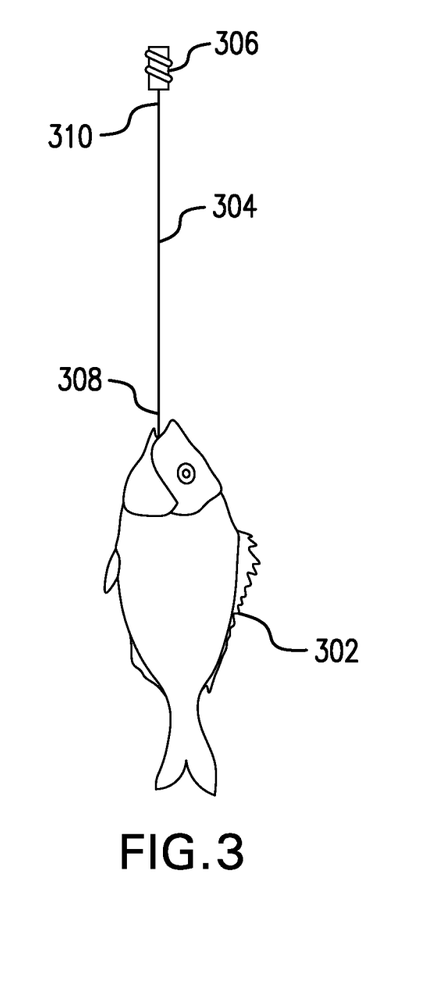
FIG. 3 is a perspective view illustrating a pet toy that is selectively connectable to the support apparatus of FIG. 2 according to an exemplary embodiment of the present invention.

FIG. 3 illustrates the toy apparatus 300 according to an exemplary embodiment of the present invention. The toy apparatus 300 includes a toy 302, a string 304 and a connecting member 306. As described above, the toy apparatus 300 may be fixed to the second end 206 of the support apparatus 200 such that the toy 302 can dangle/swing in a pendulum-like manner from the support apparatus 200 to attract a pet to play with the toy 302.

As illustrated in FIG. 3, the toy 302 resembles a fish. However, the toy 302 may alternatively resemble, for example, a ball, a bird, a mythical creature such as a unicorn, etc. However, it is noted that the appearance of the toy 302 is not limited to these examples and can take the form of any animal, object, individual, character, etc. The toy 302 may be a plush toy.

The toy 302 can be connected to the support apparatus 200 by the string 304. A first end 308 of the string 304 is connected to the toy body 302 and a second end 310 of the string 304 is connected to a connecting member 306 that facilitates a connection. The string 304 can be, for example, a cord, a wire, etc. or a shaft such as a rod or a tube, etc., of any desired length.

As shown in FIG. 3, in order to aid in selectively coupling the toy 302 with the support apparatus 200, the connecting member 306 may be a threaded rod that is configured to be selectively received within the cavity 220 of the support apparatus 200 to selectively connect the toy apparatus 300 to the second end 206 of the support apparatus 200 and allow the toy body 302 to be hung from the support apparatus 200 via the string 304.

It is noted that the present invention should not limited to the threaded rod 306/cavity 220 to selectively couple the pet toy 302 from the support apparatus 200 and other mechanisms may be used for selectively couple the toy 302 to the support apparatus 200.

In an embodiment, the connecting member 306 can be omitted from the toy apparatus 300, whereby the second end 310 of the string 304 can be fastened (e.g., tied) to the support apparatus 200.

In an assembled state, the suction cup 100 is connected to a supporting surface at an elevation above ground level with the support apparatus 200 selectively coupled to the suction cup 100 and the toy apparatus 300 selectively coupled to the support apparatus 200, the toy body 302 will hang above ground level such that the toy 302 can freely dangle and/or swing from the second end 206 of the support apparatus 200 when moved or pushed by an external force. The dangling and/or swinging motion of the pet toy 302 may be collectively referred to as dangling.

In use, the toy 302 can be contacted to attract a pet (e.g., a cat) into play. In addition, because the toy 302 can freely dangle when struck by a pet, the toy 302 can maintain a pet's interest in interacting with the toy 302 for an extended period of time.

Importantly, because the support apparatus 200 is cantilevered from the suction cup 100 in an assembled state (see FIGS. 4A, 4B and 6), the suction cup 100 is configured to resist the additional bending moment and the additional shear force resulting at the connection point between the suction cup 100 and support apparatus 200 when a pet engages with the toy 302. This includes the additional bending moment and the additional shear force that results when a pet strikes or pounces on the toy 302 as well as when the pet hangs from the toy 302. As such, the selective connection between the support apparatus 200 and the suction cup 100 is configured to withstand the weight of a pet (e.g., a cat) hanging from the toy 302.

Such a strong connection between the suction cup 100 and the support apparatus 200 results from the design and interaction of the housing 104 of the suction cup 100 and the configuration of the first end 204 of the support apparatus 200. When the support apparatus 200 is selectively coupled to the housing 104, a step-like structure that is formed at an interface between the opening 112 and the channel 114 of the housing 104 (see FIG. 1F) prevents the end cap 208 of the support apparatus 200 from becoming easily disengaged from the channel 114 of the suction cup 100.

In addition, the strong connection between the suction cup 100 and the support apparatus 200 also results due to a slant in the alignment between the suction cup 100 and the support apparatus 200, as will be described below.

Figure 4B:
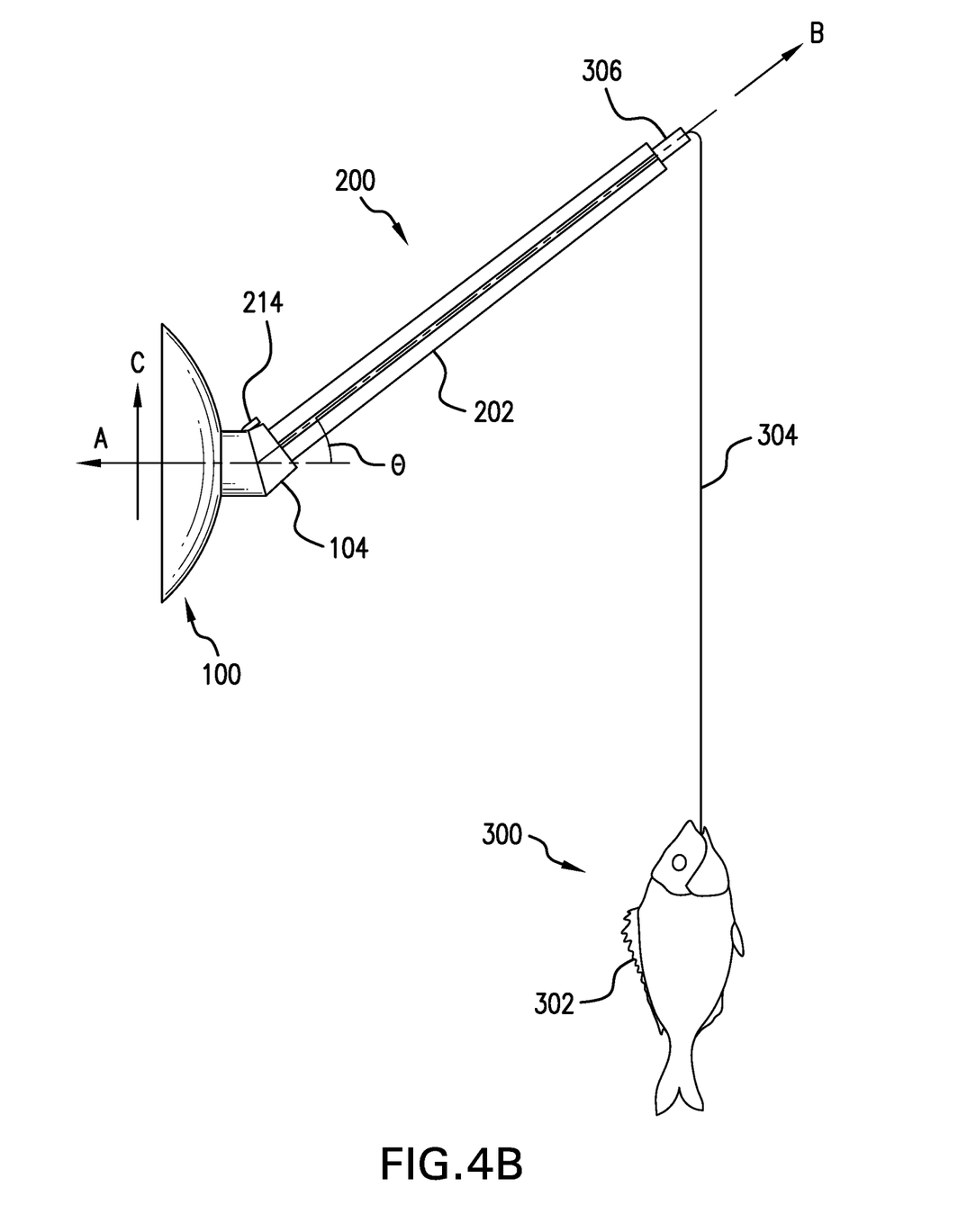
FIG. 4B is a side view illustrating the suction cup of FIGS. 1A-1F, the support apparatus of FIGS. 2A-2F and the pet toy of FIG. 3 in an assembled state with the support apparatus being aligned upwardly, according to an exemplary embodiment of the present invention.

FIG. 4A illustrates a pet toy in an assembled state with the support apparatus 200 aligned downwardly when the suction cup 100 is aligned parallel to a third axis C (e.g., an axis that extends vertically). FIG. 4B illustrates a pet toy in an assembled state with the support apparatus 200 aligned upwardly when the suction cup 100 is aligned parallel to the third axis C.

Figure 6:
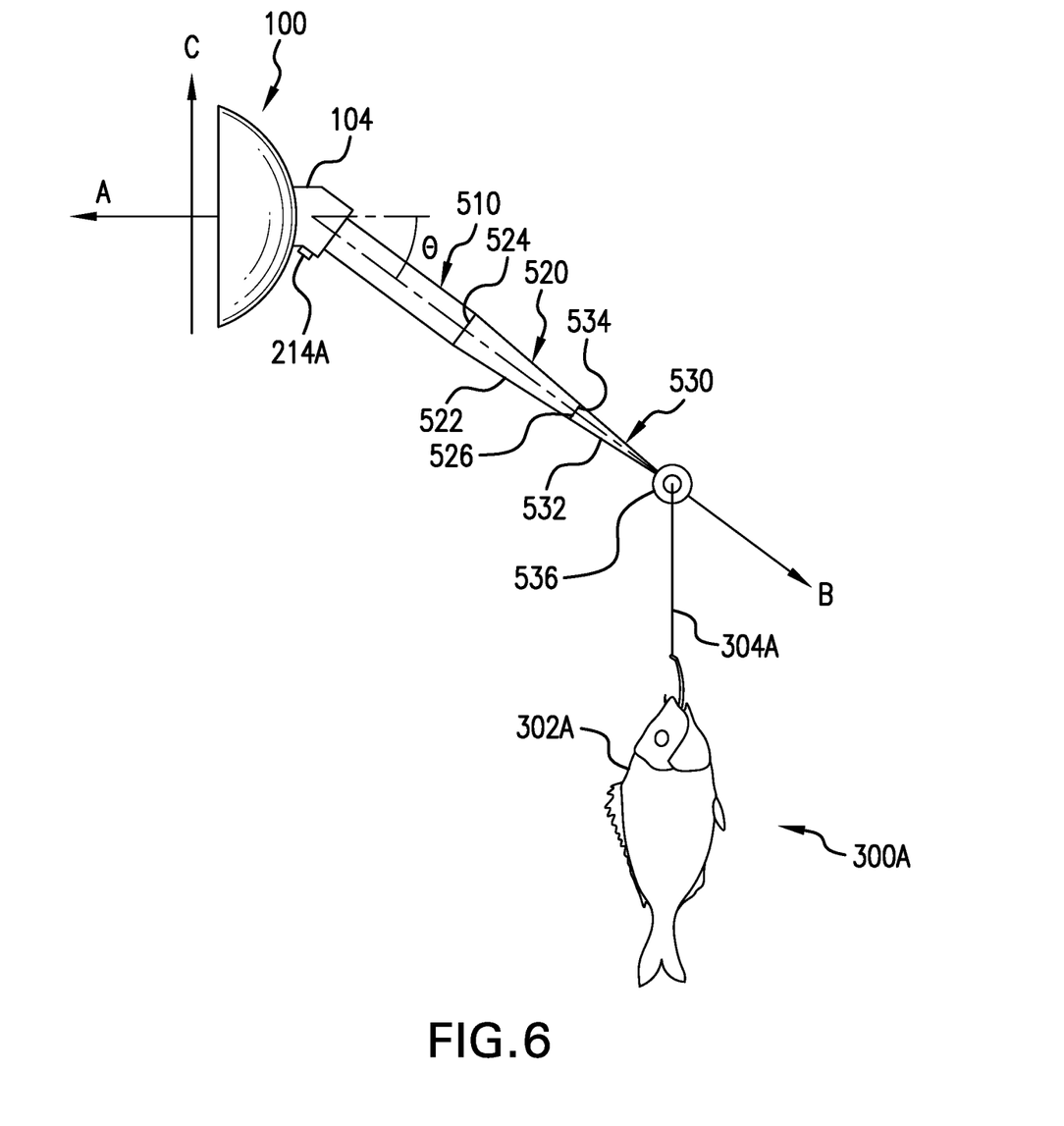
FIG. 6 is a side view illustrating the suction cup of FIGS. 1A-1F, the support apparatus of FIGS. 5A-5E and a pet toy in an assembled state with the support apparatus of FIGS. 5A-5E being aligned downwardly, according to an exemplary embodiment of the present invention.

Referring to FIGS. 1B, 1C, 1E, 1F, 4A and 4B, the suction cup 100 is configured to align the support apparatus 200 at an acute angle with respect to a first axis A that extends through the cup portion 102 and the housing 104 perpendicularly to the center of the first surface 106 of the suction cup 100. As illustrated in FIGS. 4A, 4B and 6, the first axis A extends horizontally.

Referring to FIGS. 1E, 1F, 4A and 4B, the first axis A extends through the cup portion 102 and the housing 104, and as mentioned above, extends perpendicularly to the center of the concave first surface 106.

Referring to FIGS. 1E and 1F, 4A and 4B, a second axis B extends through the middle of the opening 112 and the channel 114. The second axis B forms the acute angle Θ with respect to the first axis A that can range from about 35 degrees to about 55 degrees. In an embodiment, the angle Θ is approximately 45 degrees. Because the second axis B corresponds to the alignment of the support apparatus 200 when the support apparatus 200 is selectively coupled to the housing 104, the housing 104 is configured to maintain the support apparatus 200 slanted by the angle Θ with respect to the first axis A.

The slanted alignment of the support apparatus 200 strengthens the selective connection between the suction cup 100 and the support apparatus 200 in order to make the uncoupling of the support apparatus 200 from the suction cup 100 more difficult than it would otherwise be if the support apparatus 200 were to be aligned parallel to the first axis A. This is so when the suction cup 100 is oriented in such a way (as shown in as FIGS. 1E, 1F and 4A) that would cause the support apparatus 200 to be slanted downwardly with respect to the first axis A when the suction cup 100 is aligned as shown in FIGS. 1F and 4A and is selectively attached to a supporting surface that extends parallel to the third axis C in that alignment. The first axis A and the third axis C may be perpendicular to one another.

Additionally, the slanted alignment of the support apparatus 200 strengthens the selective connection between the suction cup 100 and the support apparatus 200 even when the suction cup 100 is oriented in such it would cause the support apparatus 200 to be slanted upwardly (as shown in FIG. 4B) with respect to the first axis A. In order to slant the support apparatus upwardly with respect to the first axis A as shown in FIG. 4B, the suction cup 100 can be rotated by 180 degrees with respect to the alignment of the suction cup 100 that is shown in FIG. 4A.

Thus, the configuration of the suction cup 100 and the configuration of the support apparatus 200 forms a selective coupling mechanism between the suction cup 100 and the support apparatus 200 that has increased resistance to failure during normal playing conditions for pets.

It is understood that the suction cup 100 can be selectively attached to supporting surfaces (e.g., a window pane, a wall tile, an appliance door, etc.,) that may not be aligned vertically. The orientation of the supporting surface, which affects the orientation of the suction cup 100 and support apparatus 200, does not affect the strength of the connection between the suction cup 100 and support apparatus 200.

The configuration of the suction cup 100 and the support apparatus 200 described above is advantageous because it enables the pet toy 302 to be separated from a wall or other supporting surface (to which the suction cup 100 is attached) by the length of the support apparatus 200. The separation distance between the surface and the toy 302 allows the toy 302 to freely dangle in all directions, thereby attracting a pet into play and maintaining the pet's interest in playing with the dangling toy for a long period of time. This is not possible when using a toy that rests immediately against a surface.

FIGS. 5A-5E illustrate a modular support apparatus 200A according to an exemplary embodiment of the present invention. The support apparatus 200A can be assembled together with the suction cup 100 and a toy apparatus 300A, as illustrated in FIG. 6.

Referring to FIGS. 5A-5E and 6, the support apparatus 200A may include a first component 510, a second component 520 and a third component 530. The first to third components 510 to 530 are selectively coupleable to one another in order to form the support apparatus 200.

Figure 5A:
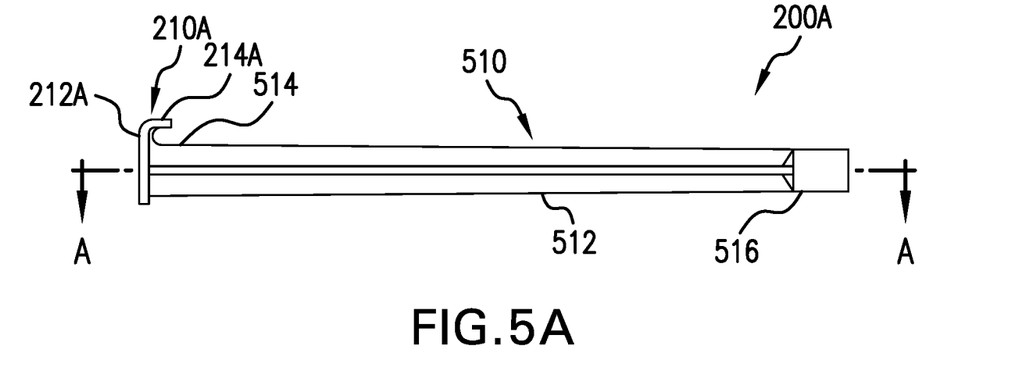
FIG. 5A is a side view illustrating a first component of a support apparatus according to an exemplary embodiment of the present invention.
Figure 5B:
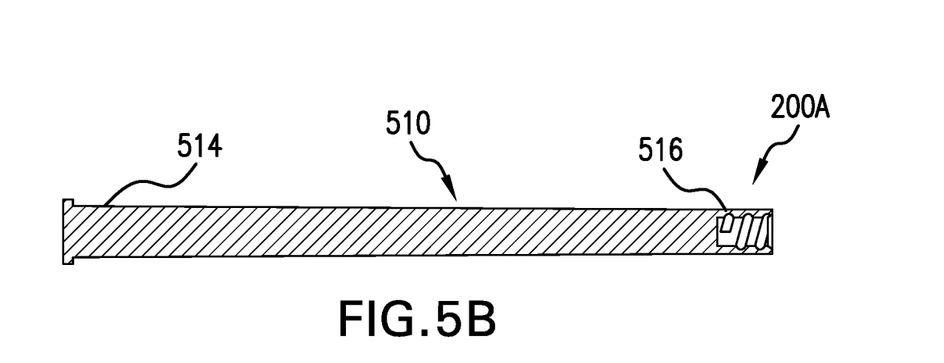
FIG. 5B is a cross-sectional view of the first component of FIG. 5A taken along line A-A of FIG. 5A.

The first component 510 may be substantially similar to the support apparatus 200. As illustrated in FIGS. 5A and 6, the first component 510 includes a body 512 extending between a first end 514 and a second end 516. The first end 512 is configured to be selectively configured to the suction cup 100. The first end 514 includes a projection 210A that has a first leg 212A and a second leg 214A that extends at an angle from the first leg 212A. The second end 516 includes an internal threaded cavity. Other parts/configuration of the first component 510 that are not described in detail may be assumed to be similar to or the same as corresponding parts/configuration of the support apparatus 200.

Figure 5C:
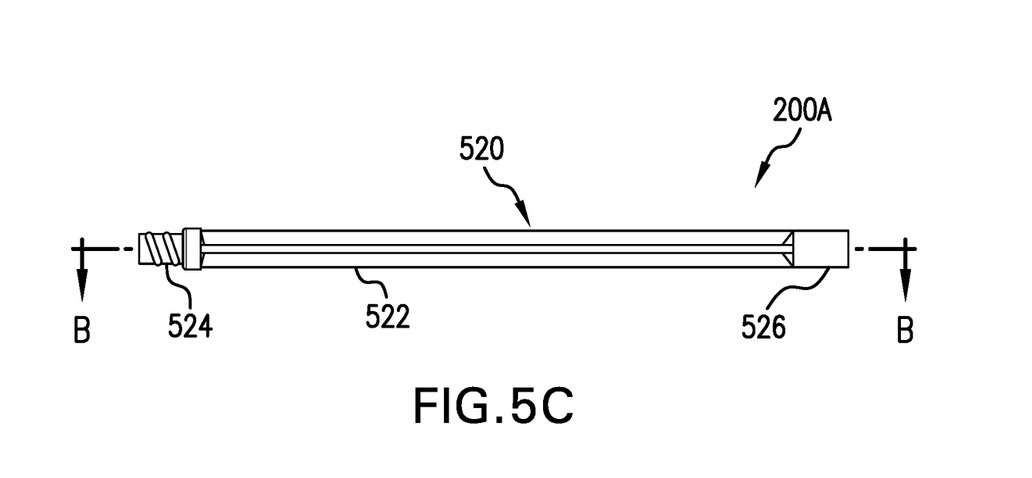
FIG. 5C is a side view illustrating a second component of a support apparatus according to an exemplary embodiment of the present invention.
Figure 5D:
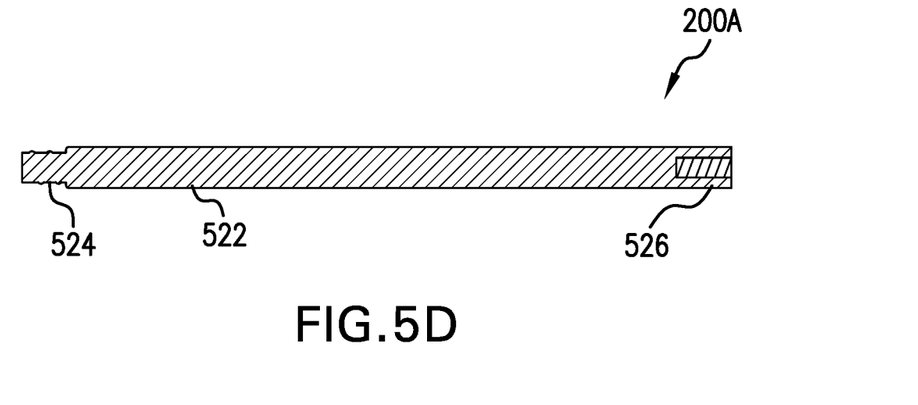
FIG. 5D is a cross-sectional view of the second component of FIG. 5C taken along line B-B of FIG. 5C.

The second component 520 may have a body 522 extending between a first end 524 and a second end 526. The first end 524 may include a threaded rod that is selectively coupleable with an internal threaded cavity at the second end 516 of the first component. The second end 526 of the second component 520 may have an internal threaded cavity, similar to the distal end of the first component 510.

Figure 5E:
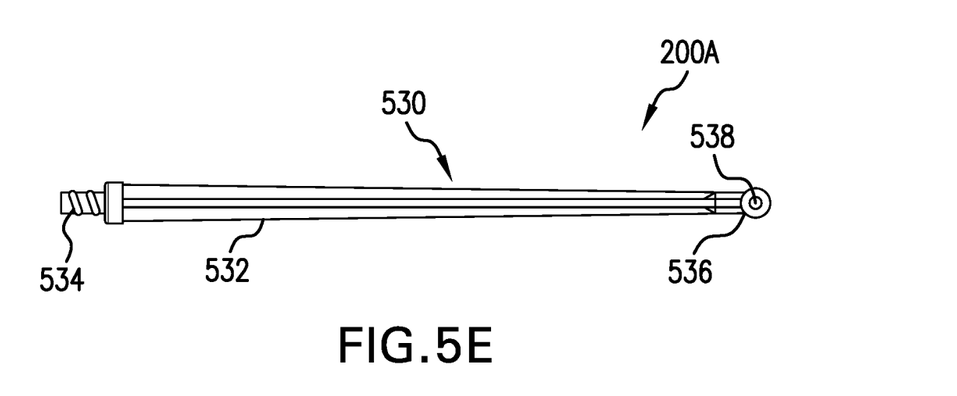
FIG. 5E is a side view illustrating a third component of a support apparatus according to an exemplary embodiment of the present invention.

The third component 530 may have a body 532 extending between a first end 534 and a second end 536. The first end 534 may include a threaded rod that is selectively coupleable with the internal threaded cavity of the second end 526 of the second component 520. The second end 536 is configured to be selectively fastenable to the toy apparatus 300A. For example, the second end 536 may include an opening 538 for selectively receiving the toy apparatus 300A.

The toy apparatus 300A includes a toy 302A and a string 304A. The toy 302A may be similar to the toy 302, and the string 304A may be similar to the string 304. The string 304A may be selectively connected to the second end 536 of the third component 530 by, for example, tying the string 304A to the opening 538 or by otherwise affixing the string 304A to the second end 536 of the third component 530. Thus, the toy 302A can dangle/swing in a pendulum-like manner from the support apparatus 200A to attract a pet to play with the toy 302A.

As illustrated in FIG. 6, the assembled toy that includes the suction cup 100, the modular support apparatus 200A and the toy apparatus 300A may be aligned such that the modular support apparatus 200A extends downwardly from the suction cup 100 when the suction cup 100 is selectively fastened to a supporting surface that is aligned parallel to the third axis C. The descriptions of the axis A and axis B that are provided above apply to the embodiment of FIG. 6. Therefore, with reference to FIG. 6, the second axis B forms the acute angle Θ with respect to the first axis A that can range from about 35 degrees to about 55 degrees. It is understood that the assembled toy of FIG. 6 can be rotated such that the support apparatus 200A extends upwardly from the suction cup 100 when the suction cup 100 is selectively fastened to a supporting surface that is aligned parallel to the third axis C.

The configuration of the modular apparatus 200A is advantageous because a user may adjust the length of the modular apparatus 200A by adding or removing components of the modular apparatus 200A. For example, FIG. 6 illustrates that the modular apparatus 200A includes the first, second and third components 510, 520 and 530. However, the present invention is not limited thereto.

For example, the length of the modular apparatus 200A can be shortened by removing the second component 520, in which case the first and third components 510 and 530 would be attached to one another (or directly attached to one another).

Alternatively, the length of the modular apparatus 200A can be increased by adding one or more additional second components 520 (i.e., a total of two or more components 520) between the first and third components 510 and 530.

Thus, the distance between the supporting surface to which the suction cup 100 is attached and the toy 302A can be adjusted as needed.

The suction cup 100, the support apparatus 200 and the toy apparatus 300, can be packaged together or in a plurality of separate packages. The suction cup 100, the support apparatus 200 and the toy apparatus 300 can be packaged together in an assembled state (e.g., connected to one another) or an unassembled state which can be selectively connected to one another by a user as described above.

When the suction cup 100, the support apparatus 200 and the toy apparatus 300 are packaged in an unassembled state, a user may perform the following steps in different orders, as desired, to assemble the three parts together. The user selectively connects the suction cup 100 and the support apparatus 200 to one another. The user selectively connects the toy apparatus 300 to the second end 206 of the support apparatus 200. The user connects the suction cup 100 to a supporting surface above ground level such that the toy 302 can freely dangle over the ground.

In addition, the suction cup 100, the support apparatus 200A and the toy apparatus 300A can be packaged together or in a plurality of separate packages. The suction cup 100, the support apparatus 200A and the toy apparatus 300A can be packaged together in an assembled state (e.g., connected to one another) or an unassembled state which can be selectively connected to one another by a user as described above.

When the suction cup 100, the support apparatus 200A and the toy apparatus 300A are packaged in an unassembled state, a user may perform the following steps in different orders, as desired, to assemble the three parts together. The user selectively connects the first, second and third components 510, 520 and 530 of the support apparatus 200A to one another in order to assemble the support apparatus 200A. The user selectively connects the suction cup 100 and the assembled support apparatus 200A to one another. The user selectively connects the toy apparatus 300A to the second end 536 of the third component 530 of the support apparatus 200A. The user connects the suction cup 100 to a supporting surface above ground level such that the toy 302A can freely dangle over the ground.

While the present invention has been particularly shown and described with reference to exemplary embodiments thereof, it will be apparent to those of ordinary skill in the art that various changes in form and detail may be made therein without departing from the spirit and scope of the present invention.

What is claimed is:

1. A pet toy, comprising:
   a suction cup including a cup portion and a housing, the cup portion including a first surface that is concave as viewed in cross-section and configured to be releasably attached to a supporting surface and a second surface that is spaced from the first surface, the cup portion being orientated about an axis that extends through a center of the cup portion, perpendicular to an outer periphery of the cup portion and the housing, which is delimited at a distal end thereof, extending from the second end of the cup portion with at least a portion of the housing extending at an angle with respect to the axis and includes a main opening extending from the distal end toward the cup portion;
   a support apparatus including a body that is delimited between a first end and a second end with the first end having a circumference that is greater than the body and is configured to be received within the main opening of the housing; and
   a toy apparatus that is connectable to the housing,
   wherein the housing includes a channel that is in fluid communication with the main opening of the housing and extends in a first direction and a second direction that is opposite of the first direction such that the channel extends beyond a periphery of the main opening in both the first direction and the second direction and to an exterior of the housing in the second direction, defining a second opening in the housing.

2. The pet toy of claim 1, wherein the support apparatus includes a projection that has a first leg extending at a first end thereof from the first end of the support apparatus and a second leg extending from a second end of the first leg at an angle with respect to the first leg that is configured to be arranged within the housing and accommodated within the second opening.

3. The pet toy of claim 1, wherein the main opening of the housing extends at an angle with respect to the cup portion along a second axis that intersects the axis extending through the center point of the cup portion.

4. The pet toy of claim 3, wherein the angle ranges from about 35 degrees to about 55 degrees.

5. The pet toy of claim 1, wherein the suction cup and the support apparatus are comprised at least in part of an elastomeric material.

6. The pet toy of claim 1, wherein the toy apparatus further comprises a pet toy that is configured to be selectively connected to the support apparatus such that when the suction cup is connected to the supporting surface at an elevation above ground level and the support apparatus is connected to the suction cup, the toy is suspended above the ground.

7. The pet toy of claim 6, wherein the pet toy is a plush toy, and the toy apparatus includes a string having a first end thereof connected to the plush toy and a second end thereof configured to be selectively connected to the support apparatus.

8. The pet toy of claim 7, wherein the toy apparatus includes a threaded element that is connected to the second end of the string.

9. The pet toy of claim 8, wherein the support apparatus includes an internal threaded cavity that extends inwardly from the second end of the support apparatus, the internal threaded cavity being releasably fastenable with the threaded element of the pet toy such that the pet toy and the support apparatus are be selectively connectable to one another.

10. The pet toy of claim 1, wherein the support apparatus is formed of a plurality of components that are configured to be selectively connectable to one another.

11. A suction cup, comprising:
a cup portion including a first surface that is concave as viewed in cross-section and configured to be releasably attached to a supporting surface and a second surface that is spaced from the first surface, the cup portion being orientated about an axis that extends through a center point of the cup portion, perpendicular to an outer periphery of the cup portion; and
a housing, which is delimited at a distal end thereof, extending from the second surface of the cup portion with at least a portion of the housing extending at an angle with respect to the axis and includes a main opening extending from the distal end toward the cup portion,
wherein the housing includes a channel defining a second internal housing cavity that is contiguous to the main opening and extends traverse to the main opening, beyond an internal periphery of the main opening,
wherein the channel extends in a first direction within the housing and a second direction that is mirror opposite the first direction to an exterior of the housing, and
wherein a step-like structure is formed within the housing along a boundary between the main opening and the second internal housing cavity.

12. The suction cup of claim 11, wherein the suction cup is comprised, at least in part of elastomeric material.

13. The suction cup of claim 12, wherein the elastomeric material is polyvinyl chloride.

14. The suction cup of claim 11, wherein the angle that is formed between the portion of the housing and the axis that extends through the cup portion ranges from about 35 degrees to about 55 degrees.

15. The suction cup of claim 14, wherein the angle that is formed between the portion of the housing and the axis that extends through the cup portion is about 45 degrees.

16. A method for assembling a pet toy, the method comprising:
providing a suction cup including a cup portion and a housing, the cup portion including a first surface that is concave as viewed in cross-section and configured to be releasably attached to a supporting surface and a second surface that is spaced from the first surface, the cup portion being orientated about an axis that extends through a center point of the cup portion, perpendicular to an outer periphery of the cup portion and the housing, which is delimited at a distal end thereof, extending from the second end of the cup portion with at least a portion of the housing extending at an angle with respect to the axis and includes a main opening extending from the distal end toward the cup portion; a support apparatus including a body that is delimited between a first end and a second end with the first end having a circumference that is greater than the body and configured to be received within the main opening of the housing; and a toy apparatus that includes a toy that is connectable to the housing;
connecting the first end of the support apparatus to the suction cup;
connecting the toy apparatus to the second end of the support apparatus; and
connecting the suction cup to the supporting surface at an elevation above ground such that the pet toy is spaced from the ground,
wherein the housing includes a channel that is in fluid communication with the main opening of the housing and extends in a first direction and a second direction that is opposite of the first direction such that the channel extends beyond a periphery of the main opening in both the first direction and the second direction and to an exterior of the housing in the second direction, defining a second opening in the housing.

17. The method of claim 16, wherein the support apparatus includes a projection that has a first leg extending from the first end of the support apparatus and a second leg extending from an end of the first leg that is distal to the first end of the support apparatus, the second leg extending at an angle with respect to the first leg that is configured to be arranged within the housing and accommodated within the second opening in the housing.

18. The method of claim 16, wherein the main opening in the housing extends at an angle along a second axis that intersects the axis extending through the center point of the cup portion.

19. The method of claim 16, wherein the second end of the support apparatus includes a cavity.

20. The method of claim 16, wherein the toy apparatus includes a plush toy and a string connected at a first end thereof to the plush toy.

21. The method of claim 20, wherein the toy apparatus includes a threaded element that is connected to a second end of the string, opposite to the first end thereof.

22. The method of claim 21, wherein the support apparatus includes an internal threaded cavity that extends inwardly from the second end of the support apparatus, the internal threaded cavity being releasably fastenable with the threaded element of the pet toy such that the pet toy and the support apparatus are be selectively connectable to one another.

* * * * *